United States Patent [19]

Janssen

[11] Patent Number: 4,666,347
[45] Date of Patent: May 19, 1987

[54] HYDRAULIC CONVEYING OF SOLIDS
[75] Inventor: Klaus Janssen, Goslar, Fed. Rep. of Germany
[73] Assignee: Preussag Aktiengesellschaft Metall, Goslar, Fed. Rep. of Germany
[21] Appl. No.: 741,675
[22] Filed: Jun. 5, 1985
[30] Foreign Application Priority Data
  Jun. 27, 1984 [DE] Fed. Rep. of Germany ....... 3423631
[51] Int. Cl.$^4$ ............................................. B25G 53/30
[52] U.S. Cl. .................... 406/144; 137/888; 406/76; 406/194; 417/85
[58] Field of Search ............ 406/48, 61, 76, 144, 406/194, 195; 417/85; 137/7, 888; 366/3, 5, 11, 150

[56] References Cited
U.S. PATENT DOCUMENTS

| 1,153,132 | 9/1915 | Pettitt | 366/11 |
| 2,534,116 | 12/1950 | Fieldstad | 366/11 |
| 2,674,190 | 4/1954 | Taylor | 417/85 |
| 3,190,701 | 6/1965 | Berkowitz et al. | 406/48 |
| 4,468,127 | 8/1984 | Agosta | 366/150 |

FOREIGN PATENT DOCUMENTS

| 104184 | 8/1979 | Japan | 406/76 |
| 2089668 | 6/1982 | United Kingdom | 406/195 |

Primary Examiner—Jeffrey V. Nase
Attorney, Agent, or Firm—Lockwood, Alex, Fitzgibbon & Cummings

[57] ABSTRACT

Solids particles are conveyed hydraulically by first mixing the solids particles with a liquid in order to form a viscous material of substantially uniform consistency. This viscous material is then introduced or injected into a flowing hydraulic medium that had been substantially free of solids prior to this viscous material injection in order to form a hydraulically conveyed flow. Variations in conduit cross-section at or near the location of viscous material injection may be provided in order to enhance turbulance and suspension of solids within the hydraulically conveyed flow.

7 Claims, 5 Drawing Figures

HYDRAULIC CONVEYING OF SOLIDS

BACKGROUND AND DESCRIPTION OF THE INVENTION

The invention relates to a method for the hydraulic conveying of solids and to an apparatus for carrying out this method.

Hydraulic conveying of solids is known, for example, in coal mining, where the coal is introduced into pipes filled with pressurized water and thus brought to the surface.

A considerable problem in the hydraulic conveying of solids arises from the difficulty of finding suitable pumps, which increases with the particle size and concentration of the solid material and with the conveying pressure required. The higher the required conveying pressure, the more uncontrollable will be the wear on the pumps when the solid material which is to be conveyed is fed to the pumps.

In hydraulic conveying plants, for example those having so-called tubular chamber chargers, use is therefore made of arrangements enabling certain amounts of the hydraulic conveying flow to be prepared in the form of a suspension of solids in pipe loops, so-called tubular chambers, and then to be injected into the conveying pipe through the timed opening and closing of valves. High-pressure pumps and solid materials are thus separated.

In this method it is however a disadvantage that the solid material is deposited in the tubular chambers as soon as the conveying is interrupted by the closing of the valves. In comparison with the actual conveying process, higher conveying speeds are needed to whirl up the deposited material again, and this is synonymous with greater energy requirements and consequently once again greater wear on the pipes. Moreover, a method of this kind leads to irregular loading of the suspension with solid material, both as regards the total amount of solid material and as regards the mass of the solid material particles. This in turn means a reduction of the effectiveness of the conveying operation.

In addition, another great disadvantage is the use of valves in the tubular chargers, which requires considerable expenditure for control for operating the valves, which in addition are subject to considerable wear.

In any case, the tubular chamber method is limited in its utilizability, for example in the conveying of a mixture of solid materials having different relative densities, particularly when the latter vary relatively substantially. In such cases, in fact, the solid materials having the higher relative density are deposited in the tubular chamber charger and are whirled up again by the current of conveying medium only at a particularly high speed, so that, for reasons of energy consumption and wear, hydraulic conveying becomes uneconomic.

The problem underlying the invention is therefore that of proposing a method of the kind first defined above and which is exempt from the above described disadvantages of known apparatus and known methods, or at least is substantially less subject to these disadvantages, so that the advantage is gained that hydraulic conveying can be applied to all solid materials and mixtures of solid materials by the use of simple apparatus.

According to the invention this problem is solved in that solid material, the particle size of which is suitable for conveying, is first mixed with liquid only to such an extent that a viscous material of high consistency is obtained, and this viscous material is then injected into the hydraulic conveying medium, which is free of solids.

In this method therefore a highly concentrated suspension is first produced, and it is then injected under favorable conditions of pressure and flow into the actual conveying medium which is free of solids and which is flowing at a suitably high speed. The conveying medium is obviously here predominantly water. The viscous material or suspension containing a high concentration of solid material is conveyed by means known per se, for example piston pumps, while the actual conveying medium free of solids provides the necessary pressure and the necessary speed of flow with the aid of high-pressure centrifugal pumps.

The viscous matieral is injected into the actual conveying pipe containing the liquid free from solids under favorable conditions of pressure and flow.

In the method according to the invention the solid material is therefore injected or introduced into the conveying process only downstream of the high-pressure pumps. The solid material consequently does not come into contact with the high-pressure pumps for the hydraulic conveying medium, so that it cannot give rise to wear. Through the use of a highly concentrated suspension, accurate metering of the amount of solid material, such as is necessary for optimum performance of the hydraulic conveying, is possible and the high pressures required can also be obtained with the aid of ordinary commercially available piston pumps.

The injection of the solid material into the hydraulic conveying medium pipe results in uniform distribution of the solid material particles in the medium and in an acceleration to the conveying speed, because the conveying medium has a turbulent flow, so that whirling and distribution of the particles of solid material are achieved automatically. The acceleration of the injected solid material to conveying speed thus constitutes no problem.

Differentiation of the slip of particles of solid materials of different reaItive densities in relation to the conveying speed also does not lead to segregation. In cases of unfavorable mixing and acceleration, variations of the speed of flow and additional turbulence in the conveying current can be achieved by varying the cross-sections of the conveying pipe, so that activated acceleration and mixing of the medium and the solid material occur. Particularly in the case of non-vertical hydraulic conveying and of a conveying speed near the critical suspension speed when the suspension is of low viscosity, these measures according to the invention are surprisingly advantageous.

Thus, in pursuance of the principle of the invention, the conveying pipe may be waisted at the point where the viscous material is injected, so that the speed of flow will be raised and thus the entraining and whirling effect will be increased. In addition, at a higher speed the static pressure will fall in the region of the waisting or constriction, so that the required elevated pressure at which the viscous material is injected, can be lowered.

A constriction of this kind in the conveying pipe may also be abruptly followed by a widening of the cross-section, so that additional turbulence is obtained. In the zone following this widening in the pipe, which is then narrowed again to the diameter of the conveying pipe, an increase of the conveying speed favorable to flow then takes place. The column of solid material being conveyed in the pipe supplying the viscous material acts, when conveying is stopped in the case of vertical conveying, as a plug sealing against the conveying medium under pressure in the main conveying pipe.

The method according to the invention is of particular interest when applied under mining conditions, because it may then be important to use the conveying of viscous material not only for direct charging of solid material into the conveying medium, but also, in extensive, ramified mine workings, for supplying material comminuted to conveying size from various decentralized points to a central charging point of the hydraulic conveying system, in the form of viscous material, even over long distances.

BRIEF DESCRIPTION OF THE DRAWINGS

The method according to the invention will now be explained once again with reference to the drawings, in which.

DESCRIPTION OF THE PARTICULAR EMBODIMENTS

Figure 1:
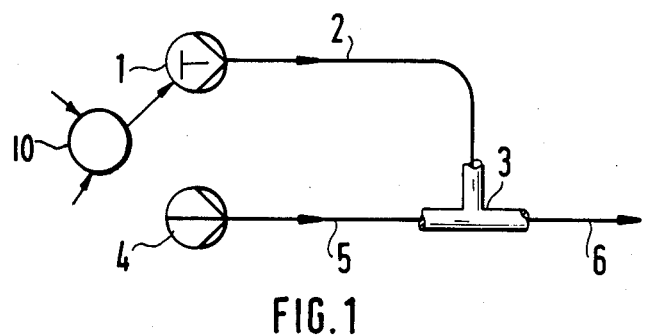
FIG. 1 is a schematic flow diagram showing the principle of the method of the invention.

In FIG. 1 the reference 1 designates a pump producing high pressures, preferably a piston pump, which draws in a highly concentrated, preferably aqueous suspension, a so-called viscous material, from a mixer 10 and feeds it into the pipe 2. This pipe 2 leads to an injection device 3, which will be described in detail further on with reference to FIG. 2. The reference 4 designates a pump producing high pressure and high speeds of flow for the actual hydraulic conveying medium, that is to say water, which however is free of solid material. This conveying medium flows through the pipe 5 and, in the injection device 3, receives the solid material, which is to be conveyed, from the pipe 2. In the pipe 6 a suspension of water and solid matter of lower concentration is then present, this suspension having the necessary speed of flow to convey and transport the solid material.

Although in FIG. 1 the main conveyor pipe containing the conveying medium free of solid material extends horizontally, it may obviously also be directed upwards or downwards, and the injection device 3 can also be disposed in a vertical run of piping.

Figure 2A:
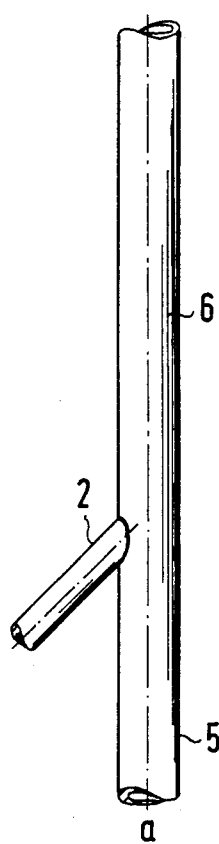
FIGS. 2a, 2b, 2c and 2d show arrangements for feeding the viscous material in a manner favorable for pressure and flow into the actual conveying pipe containing no solid material.

The injection device may be of various shapes. In FIG. 2a the reference numeral 6 designates the actual hydraulic conveying pipe in accordance with FIG. 1. The pipe supplying the viscous material bears the reference numeral 2, as in FIG. 1. The reference numeral 5 denotes the length of piping likewise in accordance with FIG. 1, which contains pure conveying medium, that is to say does not yet contain solid material, the latter being introduced into the conveying pipe 6 only in the region of the entry of the pipe 2.

Figure 2B:
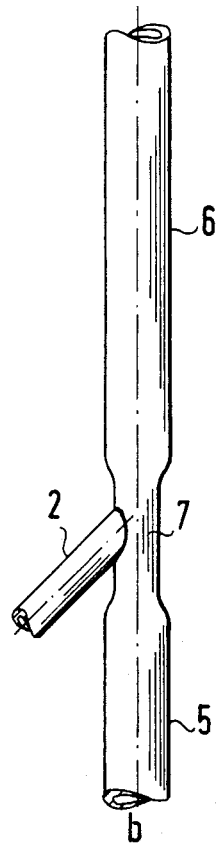

In order to improve the turbulence and suspension of the solids in the actual conveying medium, a constriction 7 is provided in the region of the entry of the pipe 2, as shown in FIG. 2b, so that a pressure drop occurs in that region together with an increase of the speed of flow and thus the conveying pressure of the viscous material in the pipe 2 can be reduced accordingly, while however the increase of the speed of flow in the main conveying pipe 5, 6 gives rise to favorable whirling of the solids.

Figure 2C:
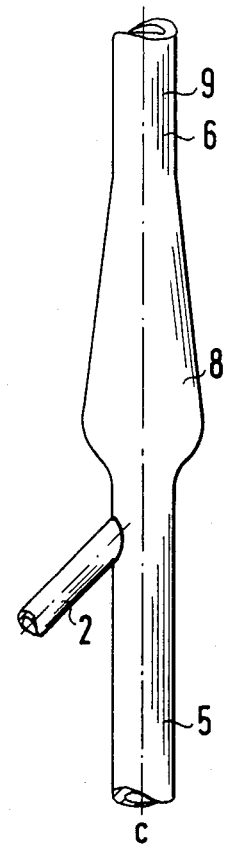

FIG. 2c shows an abrupt widening 8 of the cross-section of the conveying pipe 6. Through this abrupt widening of the cross-section, additional turbulence is produced through the formation of a vortex ring in the conveying pipe 6, while in the adjoining zone 9 of the narrowing of the cross-section of the conveying pipe the speed of conveying is increased in a manner promoting flow.

Figure 2D:
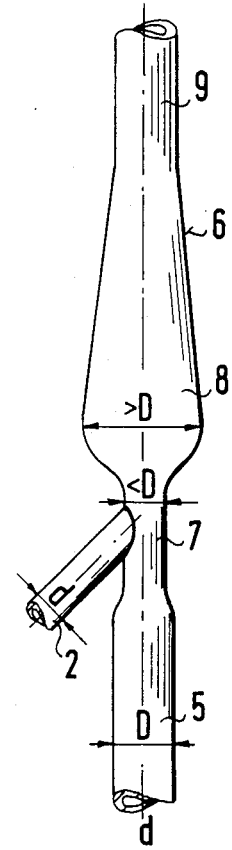

FIG. 2d combines the effects of the shapes of the injection device shown in FIGS. 2b and 2c.

The method according to the invention and the apparatuses proposed for its particularly advantageous application, particularly at the point of injection of the viscous material into the actual hydraulic conveying medium, have surprisingly shown that with their aid solid materials of the most diverse kinds and most diverse relative densities and particle sizes can be conveyed under any practical conditions with a minimum of wear and with a considerable saving of energy, so that applications hitherto impossible for hydraulic conveying because of the disadvantages described above are now made available to this form of conveying.

The expression "viscous material" or "viscous material conveying", as used in the present application, denotes a packing of solids in which each void formed by juxtaposed coarser particles is overflowingly closed by finer particles and in addition each particle of solid material is coated by a film of water permitting its local displacement.

I claim:

1. A method for hydraulically conveying solids, comprising:

mixing solid particles with a liquid at a mixing ratio in order to form a viscous material highly concentrated suspension of packed solid particles within said liquid, said viscous material mixture being of substantially uniform consistency, said solid particles being sized to be suitable for conveying while having a consistency that causes wear of high-pressure centrifugal pumps when said viscous material mixture passes therethrough;

pumping said viscous material highly concentrated suspension in a metered manner by means of a high-pressure piston pump in order to provide a metered injection flow of viscous material suspension;

directing a liquid hydraulic conveying medium to a high-pressure centrifugal pump to form a high-pressure and high speed flow of liquid hydraulic conveying medium downstream of the high-pressure centrifugal pump, said liquid hydraulic conveying medium being substantially free of solids and being miscible with said liquid of the viscous material suspension;

directing said metered injection flow of viscous material highly concentrated suspension directly into said high speed flow of liquid hydraulic conveying medium at a location only downstream of the high-pressure centrifugal pump in order to form a flow of hydraulically conveyed solids; and injecting said viscous material directly into a conveying pipe for the flowing hydraulic conveying medium and conveying said solid particles in a high pressure manner over long distances without passing through said high pressure centrifugal pump.

2. The method according to claim 1, wherein said solid material is a mined ore or coal.

3. The method according to claim 1, wherein said flow of hydraulic conveying medium is a turbulent flow, and said solid material is accelerated by said injecting step to the speed of said flow of hydraulic conveying medium.

4. The method according to claim 1, wherein said viscous material is injected into a conveying pipe for the flowing hydraulic conveying medium at a location at which the conveying pipe has cross-sectional variations that provide pressure and flow conditions which enhance said introduction of the viscous material into the hydraulic conveying medium.

5. The method according to claim 4, wherein said cross-sectional variations include a reduction in pipe cross-section generally at the location of said injecting step.

6. The method according to claim 4, wherein said cross-sectional variations include an increase in pipe cross-section closely downstream of the location of said injecting step.

7. The method according to claim 4, wherein said cross-sectional variations include a reduction in pipe cross-section, generally at the location of said injection step, and an increase in pipe cross-section closely downstream of said injecting step.

* * * * *